US009474996B2

(12) United States Patent
Thevasahayam (10) Patent No.: US 9,474,996 B2
(45) Date of Patent: Oct. 25, 2016

(54) PHOTOCATALYTIC MATERIAL FOR SPLITTING OXIDES OF CARBON (71) Applicant: EMPIRE TECHNOLOGY DEVELOPMENT LLC, Wilmington, DE (US)

(72) Inventor: Arockiadoss Thevasahayam, Chennai (IN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/577,932

(22) Filed: Dec. 19, 2014

(65) Prior Publication Data

US 2015/0107986 A1 Apr. 23, 2015

Related U.S. Application Data (62) Division of application No. 12/638,154, filed on Dec. 15, 2009, now Pat. No. 8,946,112.

(30) Foreign Application Priority Data

Oct. 30, 2009 (IN) ............................ 2645/CHE/2009

(51) Int. Cl.
B01D 53/00 (2006.01)
B01D 53/32 (2006.01)
(Continued)

(52) U.S. Cl.
CPC ............ B01D 53/007 (2013.01); B01D 53/32 (2013.01); B01D 53/864 (2013.01); B01D 53/8671 (2013.01); B01D 53/885 (2013.01); B01J 20/043 (2013.01); B01J 21/063 (2013.01); B01J 23/007 (2013.01); B01J 23/02 (2013.01); B01J 23/30 (2013.01); B01J 27/22 (2013.01); B01J 27/232 (2013.01); B01J 27/24 (2013.01); B01J 27/25 (2013.01); B01J 35/004 (2013.01);
(Continued)

(58) Field of Classification Search
None
See application file for complete search history.

(56) References Cited

U.S. PATENT DOCUMENTS 3,861,885 A * 1/1975 Schora ...................... C09C 1/56
422/150
5,322,701 A 6/1994 Cullen et al.
(Continued)

FOREIGN PATENT DOCUMENTS

CN 1696228 11/2005
CN 1832804 9/2006
(Continued)

OTHER PUBLICATIONS

"Device Uses Solar Energy to Convert Carbon Dioxide into Fuel," accessed at http://www.physorg.com/news96107693.html; accessed on Apr. 18, 2007, 9 pp.
(Continued)

Primary Examiner — Colin W Slifka
(74) Attorney, Agent, or Firm — Foley & Lardner LLP (57) ABSTRACT An embodiment relates to a photocatalytic composite material comprising (a) a first component that generates a photoexcited electron and has at least a certain minimum bandgap to absorb visible light and a structure that substantially prevents the recombination of the photoexcited electron and a hole; (b) a second component that adsorbs/absorbs an oxide of carbon; and (c) a third component that splits the oxide of carbon into carbon and oxygen using the photoexcited electron.

18 Claims, 6 Drawing Sheets (51) Int. Cl.
| | |
|---|---|
| B01D 53/86 | (2006.01) |
| B01D 53/88 | (2006.01) |
| B01J 20/04 | (2006.01) |
| B01J 21/06 | (2006.01) |
| B01J 23/00 | (2006.01) |
| B01J 23/02 | (2006.01) |
| B01J 23/30 | (2006.01) |
| B01J 27/22 | (2006.01) |
| B01J 27/232 | (2006.01) |
| B01J 27/24 | (2006.01) |
| B01J 27/25 | (2006.01) |
| B01J 35/00 | (2006.01) |
| B01J 37/00 | (2006.01) |
| B01J 37/02 | (2006.01) |
| B01J 37/04 | (2006.01) |
| C03C 17/34 | (2006.01) |

(52) U.S. Cl.
CPC ......... *B01J35/0006* (2013.01); *B01J 37/0045* (2013.01); *B01J 37/0232* (2013.01); *B01J 37/0244* (2013.01); *B01J 37/04* (2013.01); *C03C 17/3417* (2013.01); *B01D 2251/304* (2013.01); *B01D 2251/402* (2013.01); *B01D 2251/404* (2013.01); *B01D 2255/1021* (2013.01); *B01D 2255/1023* (2013.01); *B01D 2255/1026* (2013.01); *B01D 2255/2027* (2013.01); *B01D 2255/2045* (2013.01); *B01D 2255/2047* (2013.01); *B01D 2255/2094* (2013.01); *B01D 2255/20707* (2013.01); *B01D 2255/20776* (2013.01); *B01D 2255/802* (2013.01); *B01D 2257/502* (2013.01); *B01D 2257/504* (2013.01); *B01D 2259/802* (2013.01); *C03C 2217/71* (2013.01); *C03C 2217/948* (2013.01); *C03C 2218/112* (2013.01); *Y02C 10/08* (2013.01)

(56) References Cited

U.S. PATENT DOCUMENTS

| 6,383,980 B1 | 5/2002 | Hagihara et al. |
|---|---|---|
| 2002/0006865 A1 | 1/2002 | Morikawa et al. |
| 2002/0143125 A1 | 10/2002 | Kaminsky et al. |
| 2002/0151434 A1 | 10/2002 | Domen et al. |
| 2002/0169076 A1 | 11/2002 | Takeshi et al. |
| 2003/0050196 A1 | 3/2003 | Hirano et al. |
| 2003/0104930 A1 | 6/2003 | Osawa et al. |
| 2004/0241040 A1 | 12/2004 | Wei et al. |
| 2005/0130839 A1 | 6/2005 | Cheng et al. |
| 2007/0082205 A1 | 4/2007 | Anzaki et al. |
| 2008/0233029 A1 | 9/2008 | Fan et al. |
| 2008/0286643 A1 | 11/2008 | Iwasaki |
| 2011/0293503 A1 | 12/2011 | Wright et al. |

FOREIGN PATENT DOCUMENTS

| CN | 101242885 | 8/2008 |
|---|---|---|
| CN | 101301619 | 11/2008 |
| CN | 101732987 | 6/2010 |
| JP | 2000-317313 | 11/2000 |
| JP | 2001-070800 | 3/2001 |
| JP | 2003-062469 | 3/2003 |
| JP | 2004-057878 | 2/2004 |
| JP | 2004-136214 | 5/2004 |
| JP | 2008-212831 | 9/2008 |
| WO | WO-2008/088133 | 7/2008 |
| WO | WO-2009/021292 | 2/2009 |

OTHER PUBLICATIONS

Bonenfant et al., "C02 Sequestration Potential of Steel Slags at Ambient Pressure and Temperature", Industrial & Engineering Chemistry Research, 2008, vol. 47, No. 20, pp. 7610-7616.

Chen et al., "Formation of Oxynitride as the Photocatalytic Enhancing Site in Nitrogen-Doped Titania Nanocatalysts: Comparison to a Commercial Nanopowder", Advanced Functional Materials, 2005, vol. 15, No. 1.

Frost, "Geosequestration: Turning Carbon Dioxide Into Rock To Offset Global Warming", ScienceDaily, Jul. 22, 2008, pp. 1-2.

Hyett et al., "Ultra-Violet Light Activated Photocatalysis in Thin Films of the Titanium Oxynitride, $Ti_3$-$o04N$", Journal of Photochemistry and Photobiology A: Chemistry, Apr. 15, 2009, vol. 203, Issues 2-3, pp. 199-203, Available Online Feb. 10, 2009.

International Preliminary Report on Patentability for Intl. Pat. Appln. No. PCT/IB2010/054066, mailed on May 1, 2012, 5 pp.

International Search Report and Written Opinion for Intl. Pat. Appln. No. PCT/IB2010/054066, mailed on Dec. 8, 2010, 7 pp.

Lehmann, "Global Warming Predictions are Overestimated, Suggests Study on Black Carbon", ScienceDaily, Nov. 25, 2008, pp. 1-2.

Martinez-Ferrero et al., "Nanostructured Titanium Oxynitride Porous Thin Films as Efficient Visible-Active photocatalysts", Advanced Functional Materials, 2007, vol. 17, No. 16, pp. 3348-3354.

Non-Final Office Action in U.S. Appl. No. 12/638,154, dtd Dec. 11, 2012 (9 pages).

Non-Final Office Action in U.S. Appl. No. 12/638,154, dtd Jan. 29, 2014 (14 pages).

Non-Final Office Action in U.S. Appl. No. 12/638,154, dtd Jun. 14, 2013 (9 pages).

Notice of Allowance in U.S. Appl. No. 12/638,154, dtd Jul. 22, 2014 (7 pages).

Notice of Allowance in U.S. Appl. No. 12/638,154, dtd Sep. 30, 2014 (8 pages).

Porto et al., "Raman Spectra of $Ti02$, $MgF_2$, $ZnF_2$, $FeF_2$, and $MnF_2$", Physical Review, Feb. 10, 1967, vol. 154, No. 2, pp. 522-526.

Supplementary Search Report for EPO Pat. Appln. No. 10826202.3 mailed on Apr. 22, 2013, 7 pp.

The website of Dr. James L. Gole at Georgia Institute of Technology, pp. 1-17, obtained on Sep. 17, 2010 at url: <http://www.physics.gatech.edu/people/faculty/jgole.html>.

Wikipedia article "Photocatalysis," accessed Jan. 26, 2014, http://en.wikipedia.org/wiki/Photocatalyst.

Williams, "Global Warming from Carbon Dioxide Will Increase Five-Fold Over the Next Millennium, Scientists Predict", ScienceDaily, Jan. 29, 2009, pp. 1-2.

Yang et al., "Optical Properties of Titanium Oxynitride Nanocrystals Synthesized Via a Thermal Liquid-Solid Metathesis Reaction", Chemical Physics Letters, Jan. 15, 2004, vol. 383, Issues 5-6, 15, pp. 502-506.

\* cited by examiner

Figure 1

Figure 2  SEM image and EDAX spectrum

PHOTOCATALYTIC MATERIAL FOR SPLITTING OXIDES OF CARBON

CROSS-REFERENCE TO RELATED APPLICATIONS

This present application is a U.S. divisional application claiming the benefit under 35 U.S.C. §121 of U.S. patent application Ser. No. 12/638,154, filed on Dec. 15, 2009, which claims the benefit of Indian Application No. 2645/CHE/2009, filed on Oct. 30, 2009, each of which is incorporated herein by reference in its entirety.

BACKGROUND

Scientists have determined that a number of human activities may be contributing to global warming by adding excessive amounts of greenhouse gases, such as carbon dioxide, to the atmosphere. Carbon dioxide traps heat that normally would exit into outer space. While many greenhouse gases occur naturally and are needed to create the greenhouse effect that keeps the Earth warm enough to support life, human use of fossil fuels could be a source of excess greenhouse gases. By driving cars, using electricity from coal-fired power plants, and heating our homes with oil or natural gas, humans release carbon dioxide and other heat-trapping gases into the atmosphere. Deforestation is another significant source of greenhouse gases, because fewer trees mean less carbon dioxide conversion to oxygen.

During the 150 years of the industrial age, the atmospheric concentration of carbon dioxide has increased by 31 percent. One way to reverse this trend is to introduce a system that can split oxides of carbon into carbon and oxygen. One approach is to use a photocatalyst. However, most photocatalysts work in the UV region and are inefficient or do not absorb visible light.

SUMMARY

The embodiments herein relate to a photocatalytic composite material comprising: (a) a first component that generates a photoexcited electron and has at least a certain minimum bandgap to absorb visible light and a structure that substantially prevents the recombination of the photoexcited electron and a hole; (b) a second component that adsorbs/absorbs an oxide of carbon; and (c) a third component that splits the oxide of carbon into carbon and oxygen using the photoexcited electron. For example, the first component comprises a photocatalyst. For example, the photocatalyst comprises a semiconductor. For example, the photocatalyst comprises titanium oxy nitrate. For example, the certain minimum bandgap is at least about 3.4 eV. For example, the photocatalyst is crystalline. For example, the second component comprises a Group I or II carbonate. For example, the second component comprises $CaCO_3$, $MgCO_3$, $Na_2CO_3$, $NaHCO_3$ or combinations thereof. For example, the third component comprises WC, $TaO_2$, Pd, Pt, Ru, Sn or combinations thereof.

Another embodiment relates to a carbon sequestration device comprising a substrate and a photocatalytic composite material comprising: (a) a first component that generates a photoexcited electron and has at least a certain minimum bandgap to absorb visible light and a structure that substantially prevents the recombination of the photoexcited electron and a hole; (b) a second component that adsorbs/absorbs an oxide of carbon; and (c) a third component that splits the oxide of carbon into carbon and oxygen using the photoexcited electron. For example, the substrate is transparent or non-transparent. For example, the substrate comprises a quartz plate, a plastic sheet, a glass sheet, a wall of a house, a roof of a house, or combinations thereof. For example, the device can further comprise a conductive layer between the substrate the photocatalytic composite material. For example, the conductive layer is transparent or non-transparent. For example, the conductive layer comprises a metal layer, an indium-tin-oxide layer, a zinc oxide layer, an aluminum oxide layer, or combinations thereof.

Yet another embodiment relates to a method of carbon sequestration comprising exposing an oxide of carbon to a photocatalytic composite material and splitting the oxide of carbon to form carbon and oxygen, wherein photocatalytic composite material generates a photoexcited electron, adsorbs/absorbs the oxide of carbon, and splits the oxide of carbon into carbon black and oxygen using the photoexcited electron. For example, the oxide of carbon comprises carbon dioxide, carbon monoxide, carbon suboxide, or combinations thereof. For example, the method could further comprise removing the carbon black from a surface of the photocatalytic composite material. For example, the method is implemented in an urban area, a coal, gas or oil fired power generation plant, on a roof top or exterior wall of a house, an office or hotel complex, a bus stop, a parking lot, or combinations thereof.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The term "catalyst" refers to a substance that increases the rate of a chemical reaction without itself undergoing any change.

The term "photocatalyst" refers a catalyst that helps bring about a light-catalyzed reaction.

The term "latent thermal catalyst" refers to a catalyst that is latent at a first elevated temperature, but is rapidly activated at a second temperature only slightly elevated over the first temperature.

A "bandgap," also called an energy gap or band gap, is an energy range in a solid where no electron states exist.

A "metal" refers to a material that has no bandgap between the valance band and the conductance band of the material. The valance band and the conductance band overlap in a metal.

The term "semiconductor" refers to a material that has a bandgap greater than 0 eV and less than about 10 eV at 300K between the valance band and the conductance band of the material. For semiconductors, the band gap generally refers to the energy difference (in electron volts) between the top of the valence band and the bottom of the conduction band. It is the amount of energy required to free an outer shell electron from its orbit about the nucleus to become a mobile charge carrier, able to move freely within the solid material.

The term "quantum efficiency" refers to the percentage of photons hitting the photocatalyst that will produce an electron-hole pair.

Embodiments relate to photocatalytic composite materials that split an oxide of carbon into carbon (or another oxide of carbon) and oxygen when the photocatalytic composite materials are exposed to the oxide of carbon and sunlight. The oxides of carbon can be carbon monoxide, CO, carbon dioxide, $CO_2$ and carbon suboxide, $C_3O_2$.

The photocatalytic composite material of the embodiments can comprise: (a) a first component that is a photocatalyst, e.g., a semiconductor, that generates a photoexcited electron and has at least a certain minimum bandgap to absorb visible light and a structure that substantially prevents the recombination of the photoexcited electron and a hole; (b) a second component that adsorbs/absorbs $CO_2$ (in general Group I & II carbonates); and (c) a third component that is a latent thermal catalyst that splits $CO_2$ into carbon and oxygen using the photoexcited electron. The first component and the second component can be in different heterogeneous phases in the photocatalytic composite material.

In one embodiment, the photocatalyst has a bandgap of at least about 3.4 eV, which generates sufficient power to split the oxides of carbon. Below are some materials having a bandgap of at least about 3.4 eV.

| Material | Symbol | Band gap (eV) @ 300 K |
|---|---|---|
| Aluminum nitride | AlN | 6.3 |
| Diamond | C | 5.5 |
| Zinc oxide | ZnO | 3.37 |
| Zinc sulfide | ZnS | 3.6 |

In embodiments, the photocatalyst can be amorphous, thereby avoiding recombination of the photoexcited electrons and holes. A crystalline structure where recombination of the photoexcited electrons and holes is substantially prevented can also be used. A crystalline structure wherein recombination of photoexcited electrons and holes is substantially prevented of the embodiments herein is one that creates free photoexcited electrons that have sufficient power to split the oxides of carbon. Titanium oxy nitrate is an example of such a crystalline structure.

All semiconductors are not photocatalysts. Also, all photocatalysts do not work efficiently as catalysts in the visible region. An example choice of material of components one, two and three could be such so as to capture as much energy of the solar irradiation as possible, such that, the energy absorbed by the photocatalyst is sufficient to break the carbon-oxygen bond. The energy difference between the valance and conduction bands, i.e., the bandgap, determines how much solar energy will be absorbed and how much electrical energy (photoexcited electrons) is generated, with larger bandgap generally resulting in a better performance for generating the photoexcited electrons.

The first component can be a material having a certain minimum bandgap and a crystalline structure to provide good quantum efficiency. For example, the minimum bandgap can be that of titanium oxy nitrate ($TiO_xN_y$). There are other materials that have higher bandgap than $TiO_xN_y$, and can be used as the first component. In addition to the first component having a certain minimum bandgap and a crystalline structure, other factors for the selection of the first component are cheap availability of raw materials, ease of manufacture/process and handling, and non-toxicity.

The second component can be a material that satisfies the following criteria: adsorbs and/or absorbs $CO_2$; does not degenerate over a period of time (i.e., has good long term stability); and is preferably, porous, inexpensive, easy to manufacture and handle, and non-toxic. Besides $CaCO_3$ and/or $MgCO_3$, other materials such as $Na_2CO_3$ and $NaHCO_3$ can also be used as the second component.

In an embodiment, the third component is a material that is a latent thermal catalyst that splits $CO_2$ into carbon and oxygen using a photoexcited electron. Besides WC (tungsten carbide), other materials such $TaO_2$ (tantalum oxide), Pd, Pt, Ru, Sn, can be used as the third component.

In one embodiment, the photocatalytic composite material comprises clusters or particles of the first component comprising $TiO_xN_y$ (x=4.7, 4.1, 4.3, 4.5; y=1.39, 1.0, 1.1, 1.2, 1.3), the second component comprising $CaCO_3$ and/or $MgCO_3$, and the third component comprising WC. $TiO_xN_y$ and $CaCO_3$ can be in the form of clusters or particles in different heterogeneous phases. The photocatalytic composite material structure can be of a size from about 400 nm to 1000 nm, with $TiO_xN_y$ having a size of about 40 nm to 100 nm and $CaCO_3$ or $MgCO_3$ having a size of about 35 nm to 900 nm. For example, the photocatalytic composite material structure can be of a size of about 500 nm, with $TiO_xN_y$ having a size of .about.50 nm and $CaCO_3$ or $MgCO_3$ having a size of .about.450 nm.

The photocatalytic composite materials of embodiments have the following advantages:

(1) Substantially no recombination of the photoexcited electrons and holes. Recombination generally occurs in crystalline structure due to crystal defect.

(2) Substantially no simultaneous proceeding of oxidation and reduction reactions at the same sites of photocatalyst. Simultaneous redox reaction at the same site results in redox potential, which can result in inefficient catalytic activity. In the embodiments, the photocatalyst does not cause simultaneous redox reaction at the same site in the photocatalyst.

(3) Photocatalytic activity in visible-light irradiation.

(4) High quantum efficiency of energy conversion. For example, quantum efficiency of $TiO_xN_y$ is about 75% with a 100 $cm^2$ with sun light incident on a clear day having approximately 7.5 Watt of power.

(5) Easy deposition of sized clusters or sized particles.

Other embodiments relate to a carbon sequestration device comprising a substrate and the photocatalytic composite material of the embodiments disclosed herein. The substrate can be transparent or non-transparent.

In one embodiment of the carbon sequestration device, a conductive layer can be located between the substrate and the photocatalytic composite material. The conductive layer can be a transparent conductive layer or a non-transparent conductive layer. Using a transparent substrate and a transparent conductive layer, the transparent conductive layer and the photocatalytic composite material can be applied on both sides of the substrate and exposed to sunlight. Using a non-transparent substrate, such as an exterior wall or roof of a house, the non-transparent conductive layer and the photocatalytic composite material can be applied on one side of the substrate.

Generally, the substrate can be any non-conductive material such as quartz plate, glass, plastic, or an exterior wall or roof of a home, among others. The conductive layer can be a metal layer or a transparent conductive layer such as ITO (indium tin oxide), aluminum oxide or zinc oxide layer.

EXAMPLES

Figure 1:
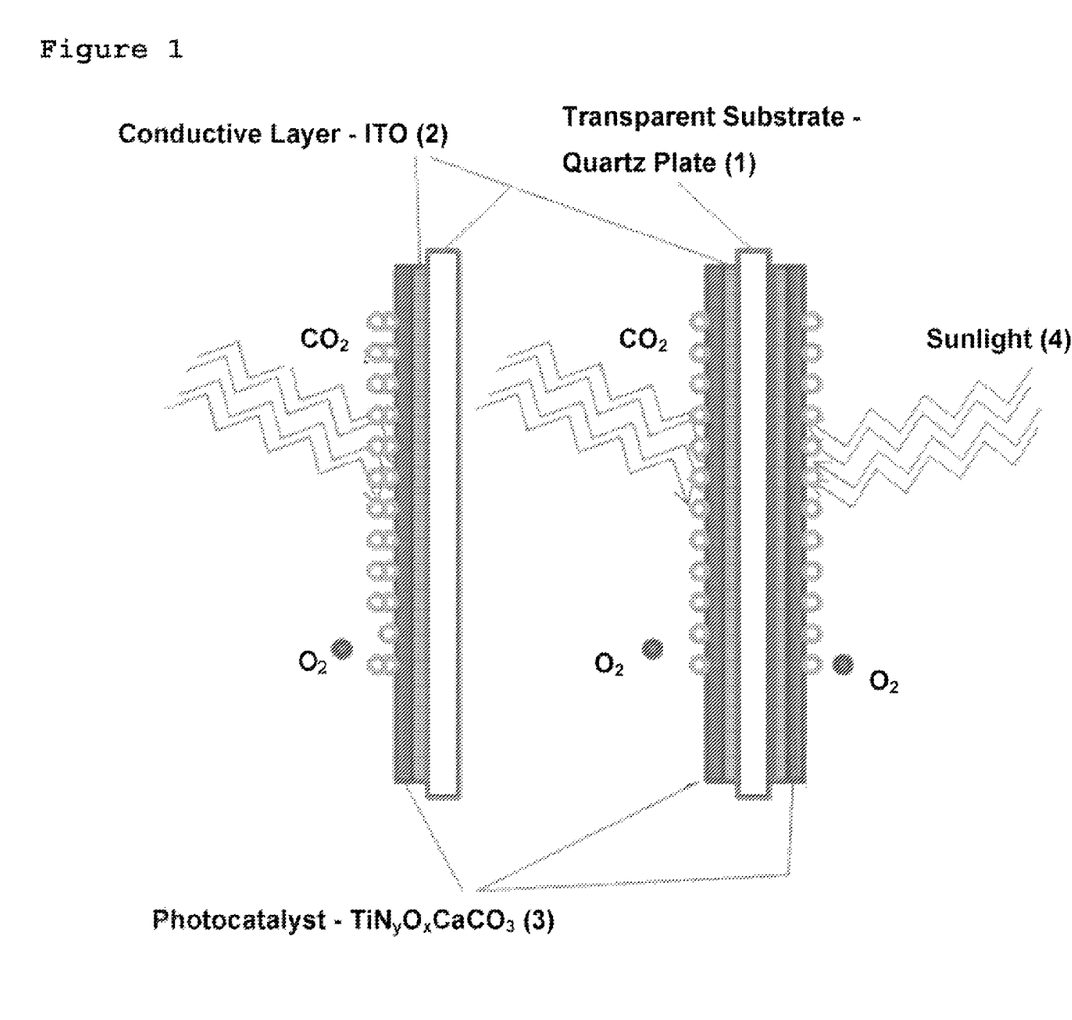
FIG. 1 shows an example of a carbon sequestration device having a substrate coated with a sample photocatalytic composite material.

An example of a carbon sequestration device is shown in FIG. 1. FIG. 1 (left) shows a single-sided carbon sequestration device exposed to sunlight (4) from one side. FIG. 1 (right) shows a double-sided carbon sequestration device exposed to sunlight (4) from both sides. The carbon sequestration device comprises a quartz substrate (1), a transparent conductive layer (2) of indium tin oxide (ITO) and a photocatalytic composite material layer (3). In the examples of FIG. 1, a composite comprising TiOxNy, $CaCO_3$ and WC can be prepared by solvent casting and spray coating a solvent mixture of the composite on a quartz plate. A TiOxNy of bandgap energy of about 3.4 eV generates photoexcited electron after absorption of photon from sun. The calcium carbonate can contain pores so as to absorb carbon oxides ($CO_2$ & CO). The binding energy of $CO_2$ & CO is 187 Kcal/mol. The absorbed carbon oxides are split by the high energy photoexcited electron generated by the TiOxNy semiconducting material.

The device of FIG. 1 was made as follows. A conducting film, such as a transparent conducting oxide (ITO) thin film, was prepared on a transparent plate, e.g., quartz plate, a plastic plate, a glass plate, using indium-tin (90:10) with resistance of about 100 ohm. The process and the photocatalytic composite material (described below) were applied to the transparent conducting oxide coated surface. The purpose of the conducting film is to transport electrons or ions from TiOxNy to $CaCO_3$.

The process for making the photocatalytic composite material having TiOxNy (x=4.7, y=1.39), $CaCO_3$ and WC, and coating it onto a desired surface (i.e., on an ITO coated glass surface) is described in the following steps:

1. Take 5 weight % calcium carbonate and 2 weight % tungsten carbide in a round bottom flask in the presence of a solution containing 30 ml, 2 m ammonia and 5%, 20 ml acetic acid glacial.
2. Stir the above composition.
3. Add 5.9 ml, 20 mmol titanium-tetra-iso propoxide drop-by-drop.
4. Spray coat onto an ITO glass or any other suitable substrate/any surface at a temperature of 430° C. in an air free environment within a vacuum spray coating chamber.

While the embodiments are not limited a particular reaction scheme, one possible reaction scheme for the process of making the photocatalytic composite material is:

There are other methods that can be employed such as ball milling method and electron spin coating method.

The spray coated carbon sequestration device was tested and the results are as follows.

Figure 2:
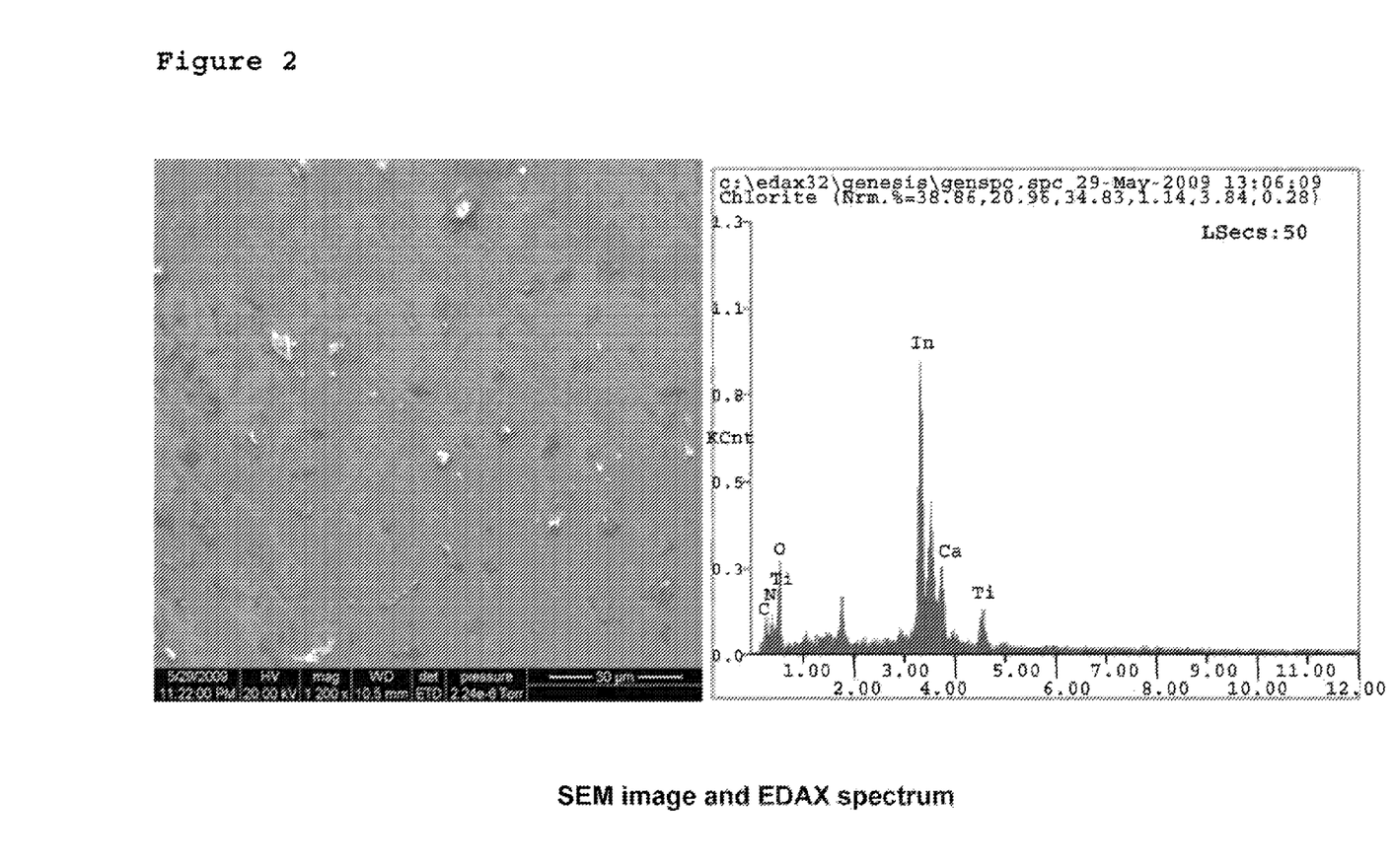
FIG. 2 shows the SEM image of a sample photocatalytic composite material and XRD EDAX spectrum of the sample.

The crystalline nature of the TiOxNy photocatalyst in the sample photocatalytic composite material was verified by SEM imaging and analyzed using EDAX/XRD (energy dispersive spectroscopy/x-ray diffraction) spectrum (FIG. 2). The purpose of XRD spectrum was to check whether the TiOxNy photocatalyst in the sample photocatalytic composite material is crystalline or amorphous or poly crystalline.

Figure 3:
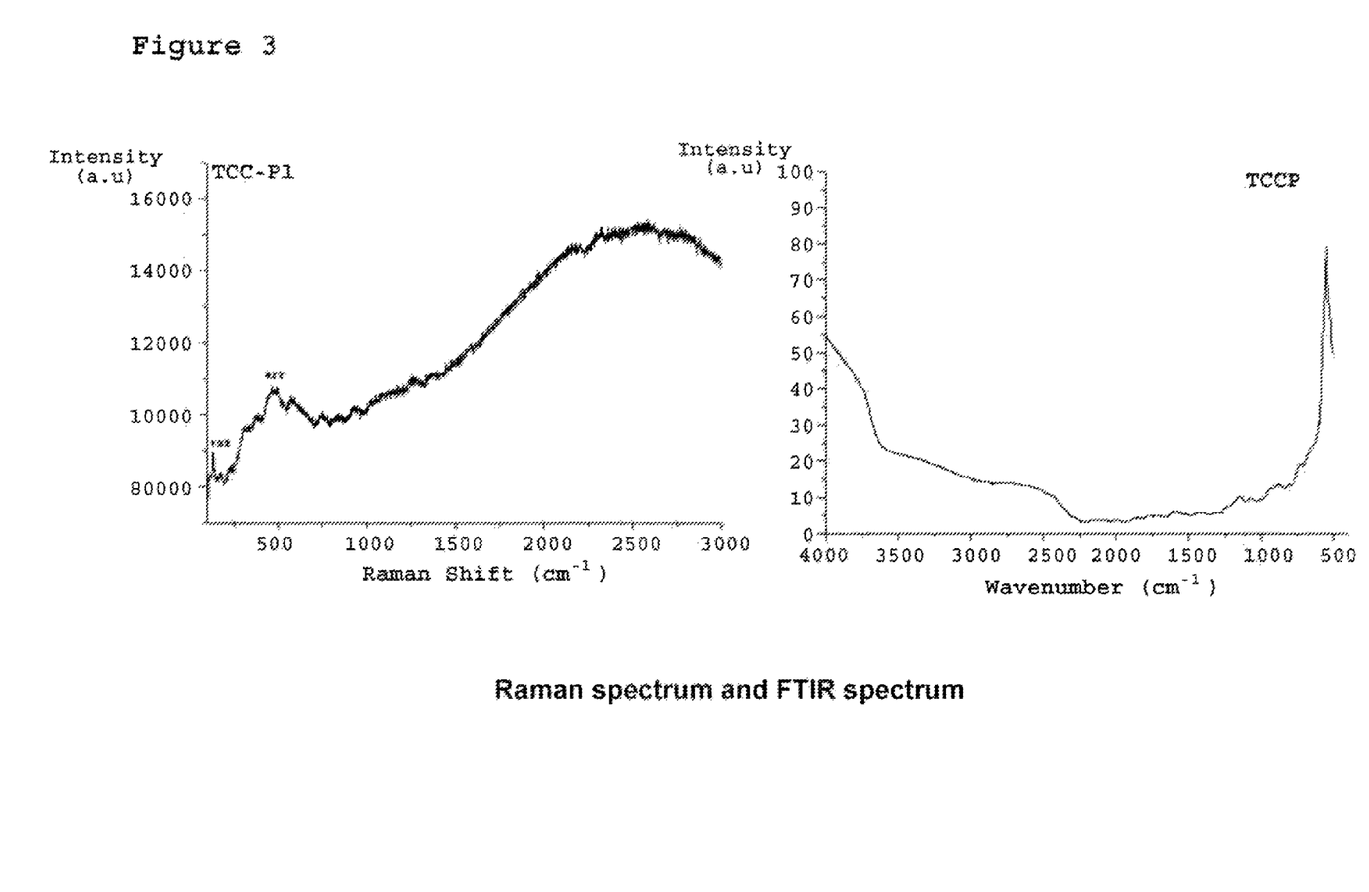
FIG. 3 shows the Raman spectrum and FTIR spectrum of the sample photocatalytic composite material.
Figure 4:
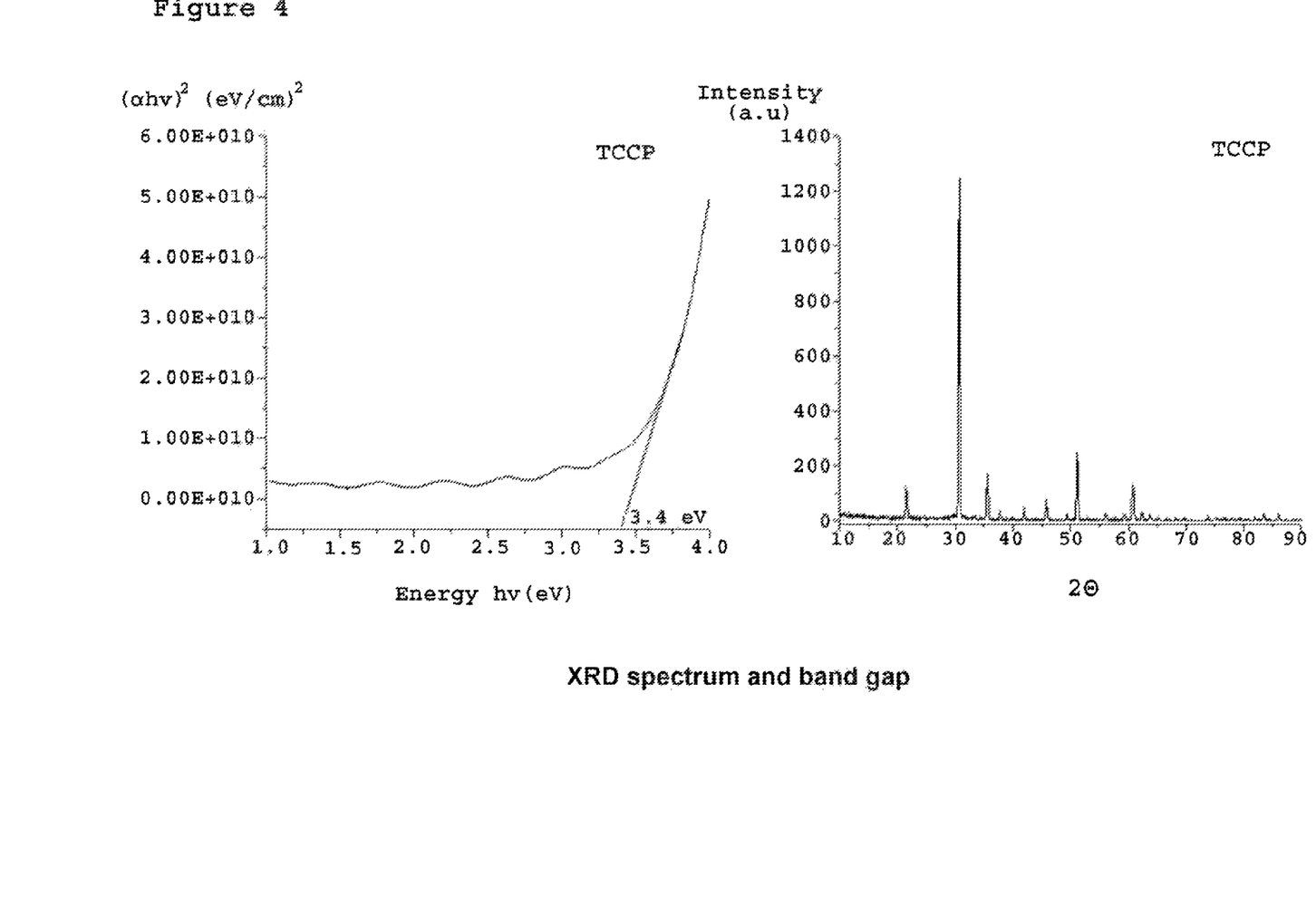
FIG. 4 shows the XRD spectrum of the sample photocatalytic composite material; the bandgap was calculated from the transmittance spectrum (UV-Vis spectrum).
Figure 5:
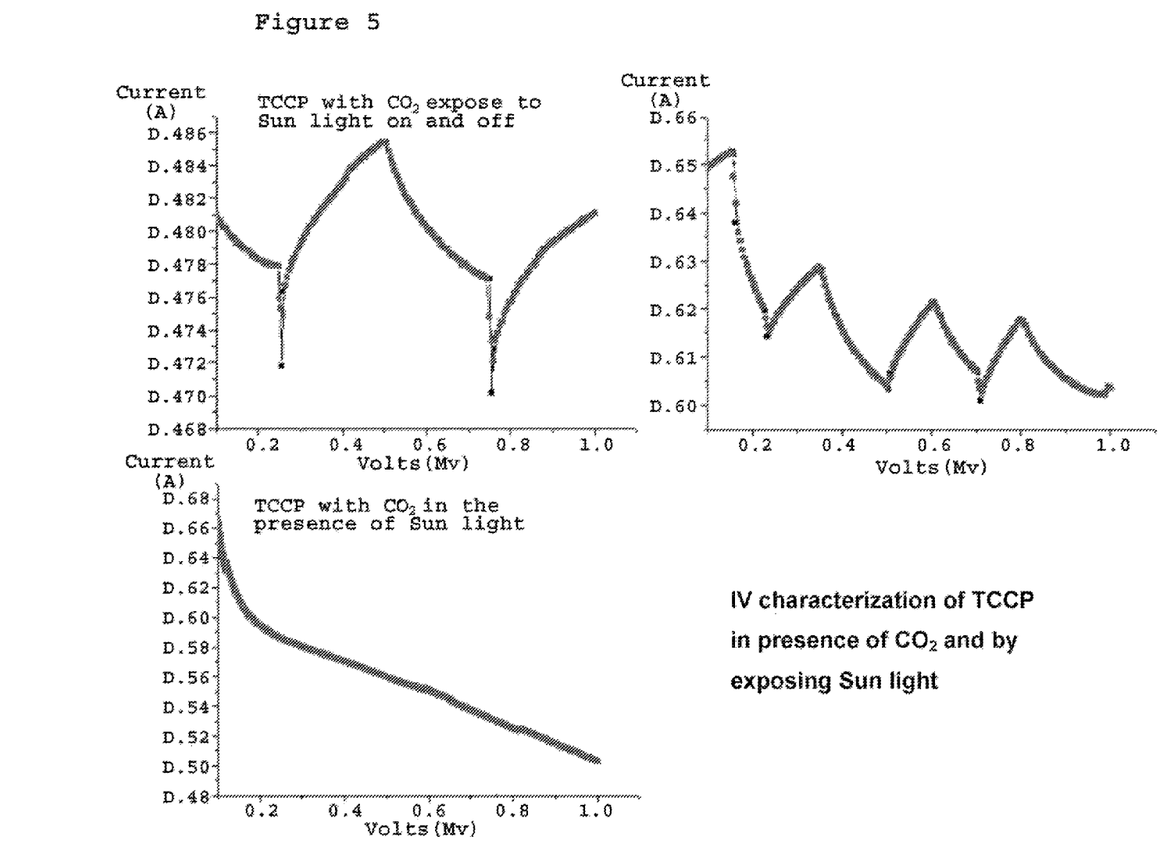
FIG. 5 shows the current-voltage (I-V) characterization of the sample photocatalytic composite material in the presence of sunlight and $CO_2$.

FIG. 3 shows the Raman and FTIR spectra of the photocatalytic composite material. FIG. 4 shows EDAX/XRD spectrum obtained using FEI quanta FEG200-HRSEM. The transparency and bandgap were measured by UV-spectrum (JASCO-V-530) (FIG. 5). In FIGS. 2-5, the term TCCP refers to Titanium Calcium Carbonate based Photo catalyst (TCCP).

While photocatalysts are generally amorphous materials, TiOxNy is a crystalline material. FIG. 2 indicates the composition present in the photocatalytic composite material. FIG. 3 indicates the presence of functional groups such as COOH, OH, $NH_2$ and SH. FIG. 4 shows the crystalline nature of the photocatalytic composite material. FIG. 5 shows the resultant photocatalytic activity measured by the current-voltage (I-V) characterization of the photocatalytic composite material when exposed to sunlight and $CO_2$. The generated photoexcited electrons were utilized for splitting carbon and oxygen. Hence, the peaks in FIG. 5 are pointing down. When the coating of the carbon sequestration device became black due to the deposition of carbon on the surface of the device, the peak height of the peaks continued to decrease because the photoexcited electron were not utilized in splitting $CO_2$ into carbon and oxygen.

From the data presented in FIGS. 2-5, it can be conclusively reasoned that the bandgap of the TiOxNy is sufficient to absorb the UV-Vis spectrum; FIG. 5a shows the functionality of the semiconducting material demonstrating generation of electrons in the presence of sunlight; FIG. 5b shows the on- and off exposure of the photocatalytic composite material to both sunlight and $CO_2$; and FIG. 5c demonstrates the splitting of $CO_2$, which was further verified as carbon black was formed.

Figure 6:
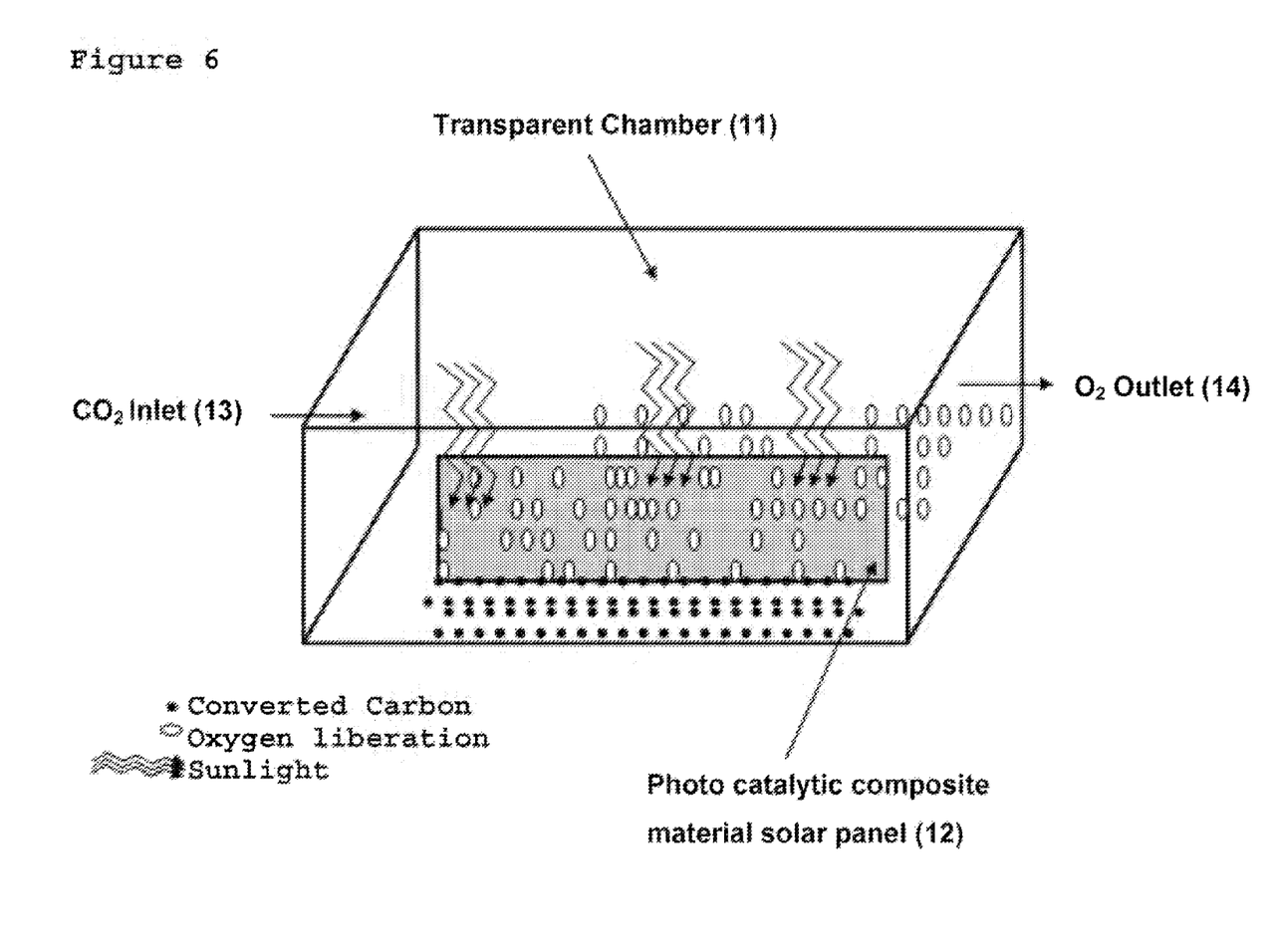
FIG. 6 shows an example of a carbon sequestration device chamber containing a sample carbon sequestration device having a substrate coated with a sample photocatalytic composite material.

FIG. 1 shows a schematic of a sample carbon sequestration device having a substrate coated with a sample photocatalytic composite material. FIG. 6 shows an example of a carbon sequestration device transparent chamber (11) containing a sample carbon sequestration device (12) having a substrate coated with a sample photocatalytic composite material. The carbon sequestration device chamber is typically a transparent chamber having a carbon dioxide inlet (13) and an oxygen outlet (14).

The sample photocatalytic composite material that prepared as explained above was exposed to sunlight and over a period of time the collection of carbon was accumulated by brushing the surface the photocatalytic composite material with a soft brush.

The photocatalytic composite material described above has various applications:

(1) For the breakdown of $CO_2$ to its constituents C and $O_2$ or CO.

(2) For the reduction in $CO_2$ in the atmosphere, when deployed on a larger scale, which may mitigate the present global warming climate crisis.

(3) For the replacement for a silicon based approach, which is expensive due to the cost structure when compared to the simple process and material used in this approach.

(4) For the adoption on its own or along with solar panels panel technology at various locations such urban areas, coal/gas/oil fired $CO_2$ generating power generation plants, on household roof tops and exterior walls of a household, office/hotel complexes, to claim carbon credits, and bus stops/parking lots.

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes, but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include, but not be limited to, systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include, but not be limited to, systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges, which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of carbon sequestration, the method comprising:
   exposing an oxide of carbon to a carbon sequestration device and splitting the oxide of carbon to form carbon black and oxygen;
   wherein:
   the carbon sequestration device comprises a photocatalytic composite material; and the photocatalytic composite material generates a photoexited electron; adsorbs or absorbs the oxide of carbon; and splits the oxide of carbon into the carbon black and oxygen with the photoexcited electron.

2. The method of claim 1, wherein exposing the oxide of carbon comprises exposing carbon dioxide, carbon monoxide, carbon suboxide, or a combination of any two or more thereof.

3. The method of claim 1, wherein the photocatalytic composite material comprises:
   a first component that generates the photoexcited electron and a hole and has a minimum bandgap to absorb visible light and a structure that substantially prevents the recombination of the photoexcited electron and the hole;
   a second component that adsorbs or absorbs the oxide of carbon; and
   a third component that splits the oxide of carbon into the carbon black and the oxygen with the photoexcited electron.

4. The method of claim 3, wherein:
   the photocatalytic composite material comprises a cluster or particle, the cluster or particle comprises the first component, the second component, and the third component;
   and the first component comprises a photocatalyst.

5. The method of claim 4, wherein the photocatalyst comprises a semiconductor.

6. The method of claim 5, wherein the semiconductor comprises titanium oxynitrate.

7. The method of claim 6, wherein the titanium oxynitrate is crystalline.

8. The method of claim 3, wherein the minimum bandgap is at least about 3.4 eV.

9. The method of claim 3, wherein the first component comprises titanium oxy nitrate of formula $TiO_xN_y$, wherein $x=4.1, 4.3, 4.5,$ or $4.7$ and $y=1.0, 1.1, 1.2, 1.3,$ or $1.39$.

10. The method of claim 3, wherein the second component comprises $CaCO_3$, $MgCO_3$, $Na_2CO_3$, $NaHCO_3$, or combinations of any two or more thereof.

11. The method of claim 3, wherein the second component comprises a Group I or II carbonate.

12. The method of claim 3, wherein the third component comprises WC, $TaO_2$, Pd, Pt, Ru, Sn, or a combination of any two or more thereof.

13. The method of claim 1, further comprising removing the carbon black from a surface of the photocatalytic composite material.

14. The method of claim 1, wherein the carbon sequestration device further comprises a substrate.

15. The method of claim 14, wherein the substrate comprises a transparent or non-transparent non-conductive material.

16. The method of claim 15, wherein the substrate comprises quartz, plastic, glass, a wall, a roof, or a combination of any two or more thereof.

17. The method of claim 14, wherein the device further comprises a conductive layer between the substrate and the photocatalytic composite material.

18. The method of claim 17, wherein the conductive layer comprises a metal layer, an indium-tin-oxide layer, a zinc oxide layer, an aluminum oxide layer, or a combination of any two or more thereof.

* * * * *

UNITED STATES PATENT AND TRADEMARK OFFICE
CERTIFICATE OF CORRECTION

PATENT NO. : 9,474,996 B2  
APPLICATION NO. : 14/577932  
DATED : October 25, 2016  
INVENTOR(S) : Arockiadoss Thevasahayam Page 1 of 1

It is certified that error appears in the above-identified patent and that said Letters Patent is hereby corrected as shown below:

In the Specification

In Column 1, Line 8, delete "§121" and insert -- § 121 --, therefor.

In Column 1, Line 9, delete "Dec. 15, 2009," and insert -- Dec. 15, 2009, now U.S. Pat. No. 8,946,112 --, therefor.

Signed and Sealed this
Seventh Day of March, 2017

Michelle K. Lee
*Director of the United States Patent and Trademark Office*